May 13, 1958 R. D. HICKOK, JR., ET AL 2,834,941
CLAMP-ON ELECTRICAL MEASURING INSTRUMENT
Filed March 5, 1953 3 Sheets-Sheet 1

INVENTORS
ROBERT D. HICKOK JR.
STERLING DAVIES
BY WILLIAM H. YENNI
Hudson, Boughton,
Williams, David & Hoffmann.
ATTORNEYS

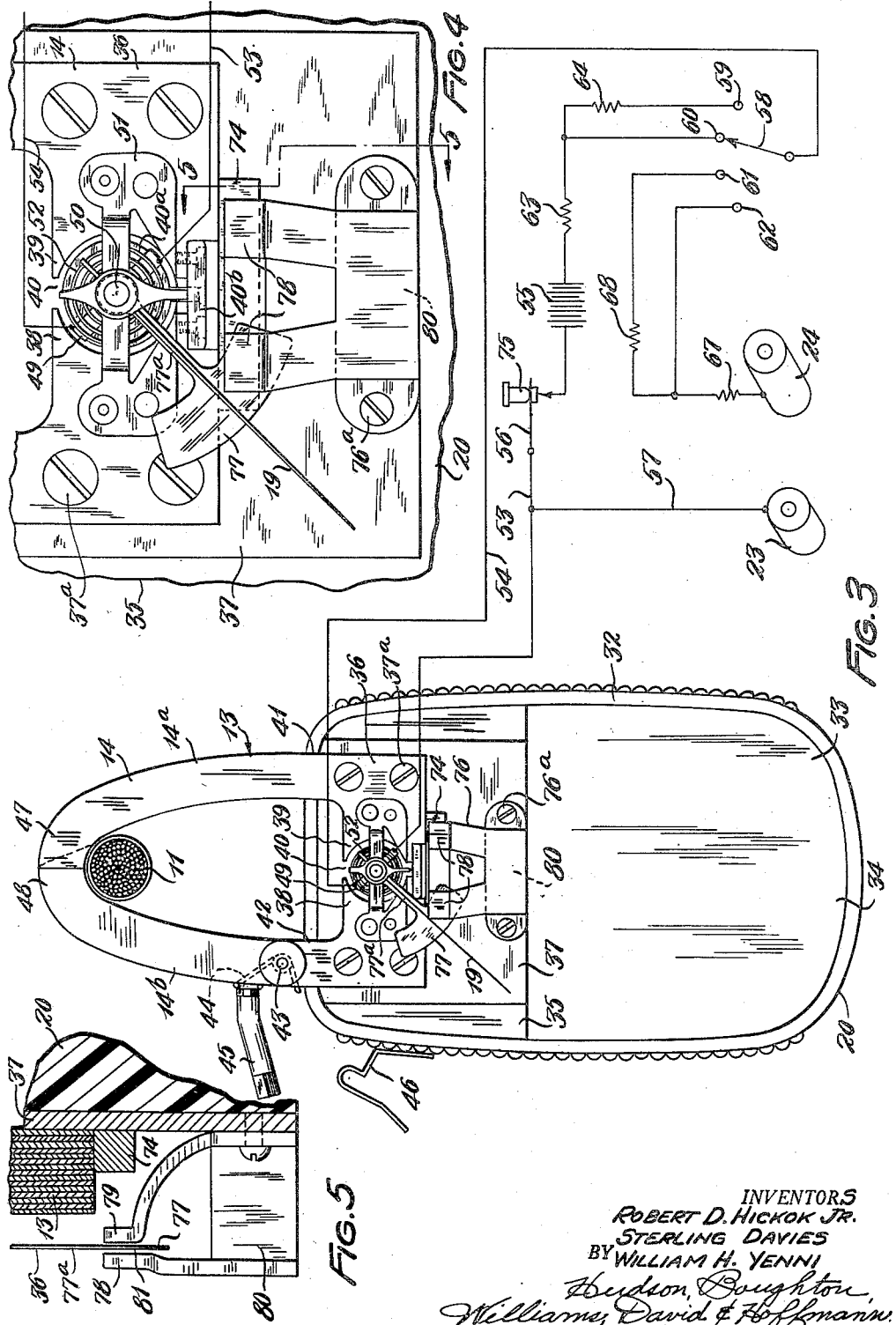

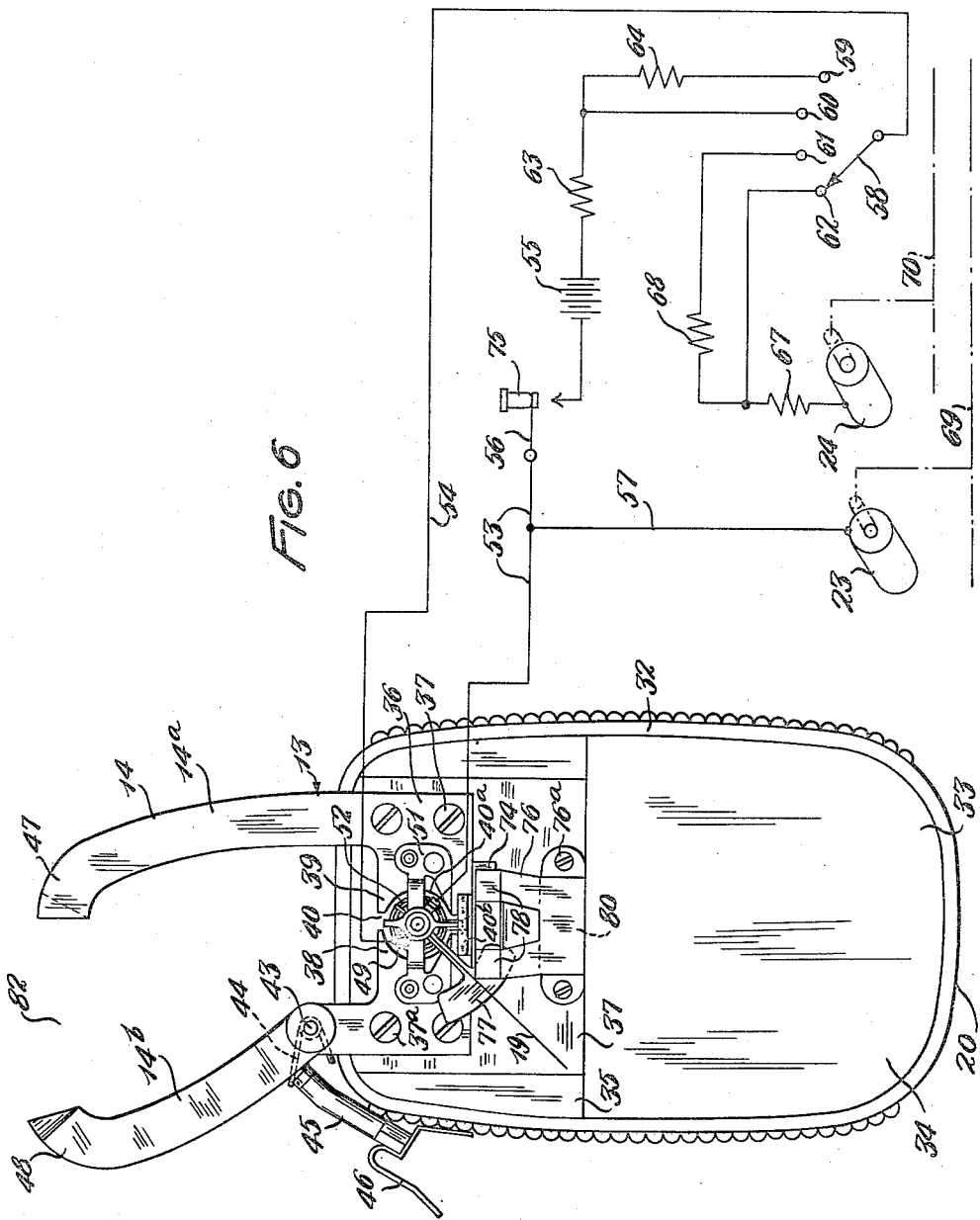

United States Patent Office 2,834,941
Patented May 13, 1958

2,834,941

CLAMP-ON ELECTRICAL MEASURING INSTRUMENT

Robert D. Hickok, Jr., Shaker Heights, and Sterling Davies, Cleveland Heights, Ohio, and William H. Yenni, Neillsville, Wis., assignors of one-half to Cleveland Patents, Incorporated, Cleveland, Ohio, a corporation of Ohio, and one-half to Auto-Test, Incorporated, Chicago, Ill., a corporation of Illinois Application March 5, 1953, Serial No. 340,474

13 Claims. (Cl. 324—127)

This invention relates to electrical measuring instruments and more particularly to a simple and practical form of direct current volt-ammeter of the clamp-on type which can be applied to various uses, but is especially suitable for testing vehicle electrical systems without interruption of the circuit.

This application is related, as to subject matter, to application Serial No. 272,296, filed February 19, 1952, now Patent No. 2,783,437.

Direct current electrical measuring instruments of the clamp-on type have been proposed heretofore, but so far as we are aware have not been practical or satisfactory for a number of specific uses such as for use on vehicle electrical systems. One reason for this is that the ampere and voltage values of vehicle electrical systems are usually low and, therefore, the available actuating flux is relatively weak and, in the instruments heretofore provided, did not produce a sufficient movement of the indicating means to permit accurate readings to be obtained.

By the present invention, this disadvantage is overcome and, as one of its objects, provides a measuring instrument preferably of the clamp-on type which is practical and satisfactory for use on vehicle electrical systems or other circuits having relatively low ampere and voltage values and in which means is employed for producing a substantial movement of the indicating means such that the indications given will be very accurate and can be easily read.

As another important object, this invention provides an electrical measuring instrument of the character referred to which will be relatively inexpensive to manufacture and which will be rugged and durable and will also be a multiple-purpose instrument usable selectively as an ammeter or a voltmeter.

Another object is to provide an electrical measuring instrument of the type having a frame structure defining a flux path and including a yoke portion movable to open and closed positions, and in which holding means effective on the movable yoke member releasably holds the same in an accurately determined open position.

Still another object is to provide a novel electrical instrument having an indicating coil movable between spaced pole portions of a frame and adapted to be supplied with energizing current, and in which a permanent magnet of high permanence characteristic and of low flux permeability is located adjacent the frame and in magnetic circuit with the pole portions thereof.

Yet another object is to provide a novel electrical measuring instrument of the kind referred to in which the indicating means includes a scale having a zero point and a pointer connected with the movable coil and movable by the latter to said zero point in response to the resultant effect of the leakage fluxes produced by the permanent magnet and by the coil energizing current.

As another object, this invention provides a novel electrical measuring instrument of the character above-indicated in which the frame includes a yoke portion adapted to embrace a current-carrying conductor and in which the indicating pointer is movable beyond the zero point of the scale in response to the effect on the coil of the flux produced by the conductor current.

A further object is to provide a novel volt-ammeter having a single moving system common to both the volts and ampere indicating means, and in which a portion of the frame structure of the instrument comprises an openable yoke means adapted to embrace a current-carrying conductor.

As another object, the invention provides a novel measuring instrument of the kind indicated above in which energizing current for the indicating coil is supplied by a miniature battery having a substantially constant terminal potential and a milliampere current output rating.

It is, likewise, an object of this invention to provide a novel clamp-on volt-ammeter in which the pole portions of the frame structure are located in a non-magnetic case with the yoke means projecting from the case, and in which the yoke means is disposed in a plane which is offset a substantial distance above the plane of the bottom surface of the case.

Additionally, this invention provides a novel measuring instrument of the character indicated in which circuit means is employed for selectively connecting the indicating coil with the miniature battery when the device is used as an ammeter or with a pair of terminals carried by the case when the device is used as a voltmeter.

The invention can be further briefly summarized as consisting in certain novel combinations and arrangements of parts hereinafter described and particularly set out in the claims hereof.

In the accompanying sheets of drawings, forming a part hereof:

Fig. 3 is a plan view somewhat diagrammatic in form and showing the instrument being used as an ammeter;

Fig. 4 is a fragmentary plan view on a larger scale and corresponding with a portion of Fig. 3;

Fig. 5 is a fragmentary sectional view taken substantially as indicated by section line 5—5 of Fig. 4; and Fig. 6 is a plan view similar to Fig. 3, but showing the instrument being used as a voltmeter.

Figure 1:
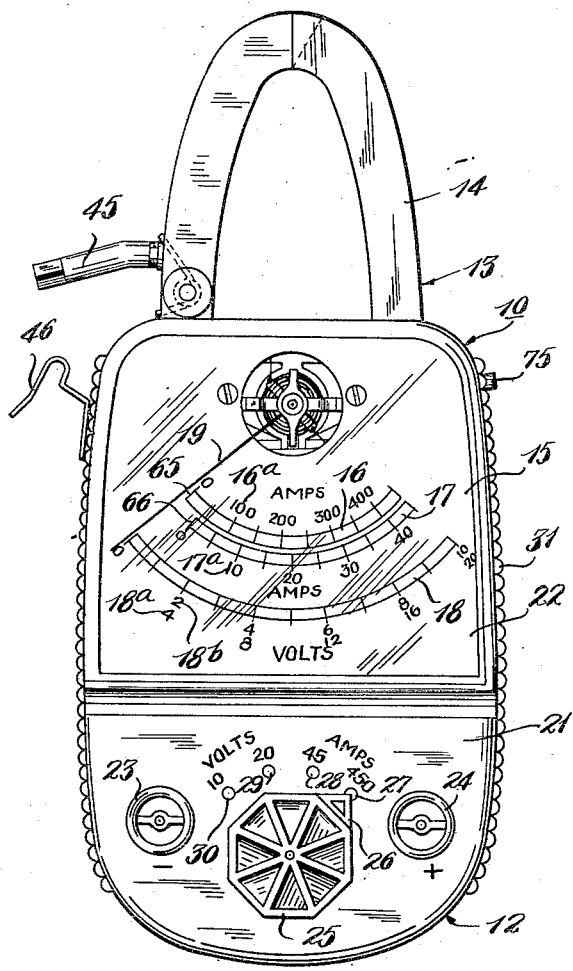
Fig. 1 is a plan view of an electrical measuring instrument employing the present invention.
Figure 2:
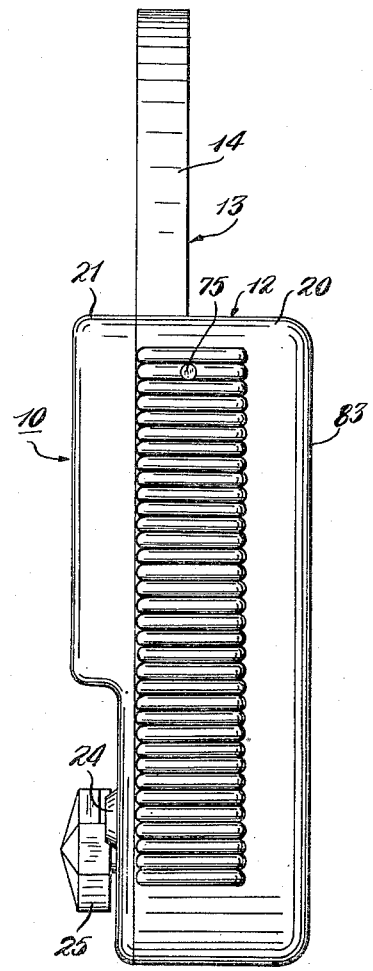
Fig. 2 is a side elevation thereof.

As one practical embodiment of the invention, the drawings show the novel measuring instrument 10 in the form of a so-called clamp-on instrument which is manually portable and is adapted to be applied to a current-carrying conductor 11. The instrument 10 comprises in general a case 12 and a frame structure or core 13 connected with and carried by such case with a yoke portion 14 projecting from the case and adapted to be brought into embracing relation to the current-carrying conductor 11. The measuring instrument 10 also embodies an indicating means which includes a dial plate 15 carrying a plurality of graduated scales 16, 17 and 18, and a pointer or needle 19 adapted for swinging movement over the dial plate and relative to the scales thereon. The scales 16 and 17 are ampere scales having graduation numerals $16^a$ and $17^a$, and the scale 18 is a voltage scale having two sets of graduation numerals $18^a$ and $18^b$.

The case 12 comprises a lower housing section 20 and a cover member 21 connected with such lower housing section and having a window 22 therein through which the pointer 19 and the dial plate 15 are visible. The cover member 21 is here shown as having a pair of terminal sockets or jacks 23 and 24 mounted thereon so as to be accessible from the exterior of the instrument. At a point between the terminal sockets 23 and 24, the cover 21 is provided with a rotary switch actuating knob 25 having a pointer projection 26 thereon and which knob is movable from one to another of a plurality of switch positions 27, 28, 29 and 30. The purpose of these switch positions and of the terminal sockets 23 and 24 will be described hereinafter.

The case 12 is of a size and shape to be conveniently grasped and held in the palm of the human hand so as to facilitate manipulation of the instrument during use thereof. For this purpose, the case 12 is of a relatively broad, flat, generally quadrangular shape, but has a generally rounded perimeter so as to be devoid of sharp angular projections or corners. To improve the grip on the case 12 when being grasped or manually held, the housing member 20 is provided along the sides thereof with knurling or ribbing 31.

The housing and cover members 20 and 21 are of nonmagnetic material and are preferably molded members made of a suitable plastic or other moldable electrically insulating material. The housing member 20 comprises side and bottom walls 32 and 33 defining a pocket or chamber 34 adapted to house the various components of the instrument. The housing member 20 also includes an integral mounting portion 35 located in the chamber 34 and elevated somewhat above the bottom wall 33 and on which the frame structure 13 is mounted.

The frame structure 13 provides a path for magnetic flux and comprises a base portion 36 located in the case 12 and a pair of yoke arms 14$^a$ and 14$^b$ projecting from one end of the case and defining the yoke portion 14. The base portion 36 of the frame includes a pair of opposed arcuate pole portions 38 and 39 having an air space or gap 40 therebetween. The yoke arms 14$^a$ and 14$^b$ project from the case 12 through suitably located openings 41 and 42 in the wall 32.

The frame 13 preferably comprises stacked laminations carried by a non-magnetic base plate 37 which, in turn, is secured to the mounting portion 35 of the case 12 by suitable screws 37$^a$. The frame 13 is made of a suitable magnetic material having a high permeability and a low retentivity, such as a nickel-iron alloy of the kind known as Allegheny Electric Metal 4750. The metal of the frame 13 preferably also has the characteristic that it does not become saturated by the magnetic flux which is supplied thereto within the range of the intended or rated use of the instrument 10.

The yoke arm 14$^a$ is a fixed arm, but the arm 14$^b$ is movable relative to the fixed arm for opening and closing the yoke portion 14 by swinging about a pivot pin 43. The movable yoke arm 14$^b$ is normally urged toward a closed position in engagement with the fixed yoke arm 14$^a$, as shown in Fig. 3, by means of a torsion spring 44 located at or adjacent the pivot pin 43. A lever member 45 connected with the movable yoke arm 14$^b$ and projecting laterally therefrom is readily accessible for applying manual opening movement to this yoke member.

It is important to the accuracy of the voltage readings to be obtained from the instrument 10, that the open position of the yoke arm 14$^b$ always be at a predetermined spaced relation to the fixed arm 14$^a$. For this purpose the outer end of the lever member 45 is movable into engagement with a positioning member which is here shown as being spring latch member 46 and which holds the movable yoke arm 14$^b$ in such predetermined open position, as shown in Fig. 6. When the latch member 46 is sprung in a direction to release the lever member 45, the spring 44 will swing the yoke arm 14$^b$ to its closed position in which the hook-like ends 47 and 48 of the yoke arms have a close fitting cooperation for establishing a closed magnetic circuit through the yoke portion 14.

The measuring instrument 10 also comprises a movable coil 49 located in the air gap 40 and between the poles 38 and 39 and to which the movable pointer 19 is connected. The coil 49 is disposed around and movable relative to a fixed inner core member 40$^a$ and is pivotally supported in this location by suitable top and bottom bearings 50 carried by top and bottom plates 51. The plates 51 are suitably secured to the base portion 36 so as to extend substantially diametrically across the air gap 40. The inner core member 40$^a$ is a substantially cylindrical body supported in the air gap 40 by being mounted on a bridge member 40$^b$ which is suitably secured to the base portion 36. A conventional spiral hairspring 52 is connected with the pointer 19 and is effective thereon for swinging the pointer toward its zero position when the coil 49 is deenergized.

Circuit means is provided for supplying energizing current to the movable coil 49 and includes a pair of conductors 53 and 54 which are connected with opposite ends of the coil. The conductor 53 is connected with one terminal of a miniature battery 55 through a normally open push-button switch 56. The conductor 53 is also connected with the terminal socket 23 of the case by the branch conductor 57. The conductor 54 is connected with a movable switch member 58 which is attached to or carried by the knob 25 and is movable by the latter into engagement with any desired one of a group of stationary switch contacts 59, 60, 61 and 62 which correspond, respectively, with the above-mentioned switch positions 27, 28, 29 and 30.

The switch contacts 59 and 60 are connected with the opposite terminal of the miniature battery 55 such that when the movable switch arm 58 is in engagement with either of these stationary switch contacts and the pushbutton switch 56 is closed, current will then be supplied to the movable coil 49 from the battery. The switch contacts 61 and 62 are connected with the terminal socket 24 such that when the switch arm 58 is in engagement with either of the latter contacts, the movable coil 49 will be connected with the terminal sockets 23 and 24 and at this time, the portion of the circuit containing the miniature battery 55 will be ineffective. Similarly, when the switch arm 58 is in engagement with one or the other of the contacts 59 and 60, the portion of the circuit containing the terminal sockets 23 and 24 will be ineffective.

The switch contact 59 is connected with the battery 55 through two resistances 63 and 64 located in series in the coil energizing circuit, such that when the switch arm 58 is in engagement with this contact, the amount of energizing current which will be supplied to the movable coil 49 by the battery when the push-button switch 56 is closed, will cause an initial movement of the pointer 19 to the zero graduation 65 of the ampere scale 16. The switch contact 60 is connected with the battery 55 only through the resistance 63, such that when the switch arm 58 is in engagement with this contact, and the push-button switch 56 is closed, the amount of current supplied to the movable coil 49 by the battery, will cause the pointer 19 to be moved to the zero graduation 66 of the ampere scale 17.

The stationary switch contact 61 is connected with the terminal socket 24 through two resistances 67 and 68 located in series in the coil energizing circuit, and the switch contact 62 is connected with this same terminal socket through the single resistance 67. When the switch arm 58 is in engagement with the switch contact 61 and energizing current is supplied to the movable coil 49, through the terminals 23 and 24 from a pair of line conductors 69 and 70 whose voltage is to be measured, the movement of the pointer 19 along the voltage scale 18 will be read from the graduation numerals 18$^a$ of this scale. When the switch arm 58 is in engagement with the contact 62, the voltage readings from the scale 18 will be taken from the graduation numerals 18$^b$ of this scale.

In accordance with an important feature of the present invention, the measuring instrument 10 also includes a permanent magnet 74 located in magnetic circuit with the pole members 38 and 39, preferably by being mounted on the base portion 36 of the frame structure 13 in spanning relation to the air gap 40. The permanent magnet 74 can be secured in this position by being adhesively connected to the base portion 36 as by means of a suitable type of cement, or can be connected with this portion of the frame by any other suitable connecting means. The main purpose of the permanent magnet 74 is to supply flux through the air gap 40 while the yoke portion 14 is in its open condition and during use of the instrument as a voltmeter, as shown in Fig. 6. A second purpose of the permanent magnet 74 is that it provides for the establishment of an electrical zero at a desired point on the dial plate 15 for the ampere scale or scales, as is further described hereinafter.

The magnet 74 is a permanent magnet having a high permanence characteristic. This permanent magnet also has a low permeability characteristic, that is to say, a relatively high resistance to passage of magnetic flux therethrough. These characteristics of the permanent magnet 74 are very important for reasons which will presently be explained.

When the measuring instrument 10 is being used as a voltmeter and the yoke arm 14$^b$ is in its open position, all of the flux being supplied to the frame by this permanent magnet traverses the air gap 40 and provides a magnetic field for the movable coil 49. At this time, the switch arm 58 is in its voltage-measuring position, as for example, in engagement with the switch contact 62 as shown in Fig. 6, and current will then be supplied to the movable coil 49 from the line conductors 69 and 70 whose potential difference is being measured. The energization of the coil 49 while in the magnetic field being supplied by the permanent magnet 74, causes displacement of the coil thereby moving the pointer 19 along the voltage scale 18.

When the measuring instrument 10 is being used as an ammeter, the switch arm 58 is in its current-measuring position, as for example, in engagement with the switch contact 60 as shown in Fig. 3. At this time, the yoke portion 14 of the frame is moved into an embracing relation to the current-carrying conductor 11 whose current is to be measured, with the movable yoke arm 14$^b$ in its closed position as also shown in Fig. 3. The push-button switch 56 is now closed by pressing the actuating button 75 inwardly, whereupon current is supplied by the battery 55 to the energizing coil 49.

During this use of the instrument as an ammeter, the yoke arms 14$^a$ and 14$^b$ are in magnetic circuit with the pole members 38 and 39 and the flux produced by the current flowing in the conductor 11 will traverse the yoke portion and the pole members and will be effective on the coil 49 to cause movement of the pointer 19 along the ampere scales 16 and 17.

The battery 55 is a battery of miniature size, such that it can be located in the case 12 and is also a battery having a substantially constant terminal voltage, for example 5.3 volts, and a milliampere output current rating. Batteries of this kind are commercially available for various special services, such as in hearing aid equipment, and the like, and can be of the so-called mercury-cell type. A miniature battery of this kind has a relatively long life during which its terminal voltage and milliampere current output remain substantially constant.

Since the permanent magnet 74 is in a fixed relation to the frame structure 13, it will form a high reluctance magnetic shunt between the pole members 38 and 39 and across the air gap 40. However, since the permanent magnet 74 is a high reluctance magnet as mentioned above, the major portion of the flux which traverses the pole members 38 and 39 during the use of the instrument as an ammeter and which comes from the flux field being generated by the current flowing in the conductor 11, will pass through such pole members and only a small portion of the flux in the frame will be shunted through the high reluctance permanent magnet. The flux field produced in the air gap 40 by the current in the conductor 11 will, therefore, predominate as the flux which is effective in causing movement of the coil 49 when the latter is energized by current from the battery 55. The resulting movement of the coil will cause the pointer 19 to be swung over the ampere scales 16 and 17 and moved therealong for a distance beyond the zero point corresponding with or proportional to the ampere value of the current flowing in the conductor 11. This current value is then read from one or the other ampere scales 16 or 17, depending upon whether the switch arm 58 is in engagement with the contact 59 or the contact 60.

The low permeability characteristic of the magnet 74, that is to say, its high resistance to passage of magnetic flux therethrough, is important because it is this characteristic which prevents the flux from the conductor 11, or any substantial portion thereof, from being shunted through this magnet while the instrument is being used as an ammeter. Because of this high resistance characteristic, the magnet 74 can be left permanently in engagement with the frame portion 36 in bridging relation to the air gap 40 without defeating the desired use of the instrument as an ammeter by utilizing the flow of flux produced in the frame structure by the current of the conductor 11.

The high permanence characteristic of the permanent magnet 74 is also important for the purpose of maintaining the strength or flux-producing ability of this magnet throughout a prolonged period of service for the instrument 10 by preventing this magnet from being demagnetized by the flux from the conductor 11 when the instrument is being used as an ammeter. The permanence characteristic of the magnet 74 should be such that the flux flow produced between the pole members 38 and 39 by this magnet will be of substantially constant strength over a period of years.

The high reluctance and high permanence characteristics of the magnet 74 are obtained in part from the particular size and shape of this magnet and in part from the particular magnetic material or composition from which it is made. With respect to the shape of this magnet, it is essential that it be relatively long and that it be of a relatively small transverse cross-sectional area. The drawings show this magnet as being a substantially straight bar magnet which is relatively long and slender and, although a substantially square cross-sectional shape is shown and is preferred, the magnet could have any one of various other cross-sectional shapes.

In the measuring instrument 10 for example, when measuring a current value of approximately 45 amperes in the conductor 11 with a desired scale deflection of the pointer 19 of at least 90° and with the indicating coil 49 having a resistance of approximately 190 ohms and comprising 475 turns and energized by a current of approximately 4.5 milliamperes from the battery 55, a satisfactory size and shape for the permanent magnet 74 has been found to be approximately one inch long and three sixteenths of an inch square in cross-section.

In order that the magnet 74 have the above-mentioned high permanence characteristic, it should be made of a suitable magnetic material or composition which will provide this desired characteristic. For use in the measuring instrument 10 in conjunction with the values already given above for this instrument, a permanent magnet 74 made of Alnico V has been found to be very satisfactory. An Alnico V permanent magnet is one which is known commercially to comprise substantially the following composition: 8% aluminum; 14% nickel; 24% cobalt; 3% copper; and the balance iron. A permanent magnet made of Alnico V material and having the above-specified dimensions, will be recognized by those skilled in the art as being a relatively small magnet and one which, although substantially fully saturated, will also be relatively weak in the sense that the total number of lines of magnetic force produced thereby will be relatively low. The permanent magnet 74 can therefore be further described as being one whose total number of lines of force is only sufficient to establish the electrical zero or reference value graduation of the ampere scale at the desired location on the dial plate when the yoke 14 is closed.

Although the permanent magnet 74 is here referred to as being an Alnico V permanent magnet, it will be understood, of course, that any other equivalent or more desirable permanent magnet composition which would be suitable for this purpose could be used, and particularly other suitable permanent magnets which embody cobalt but which comprise specific compositions different from that given above for Alnico V.

From the foregoing it will be recognized that when the permanent magnet 74 comprises a magnetic composition having a permanence characteristic as high or higher than Alnico V, and is of a relatively long slender shape it will have the requisite high reluctance and high permanence characteristics referred to above as being essential in the instrument 10.

Sudden movements or violent oscillations of the pointer 19 when the movable coil 49 is energized, are undesirable and can be prevented by a dampening means which is here shown as comprising a fixed field unit 76 secured to the base plate 37 by means of the screws 76ª, and a relatively thin flat metal vane 77 connected with the pointer 19. The vane 77 is movable between a pair of pole members 78 and 79 (see Fig. 5) to which flux is supplied by a permanent magnet 80 forming a part of the unit 76. The vane 77 is connected with the pointed 19 by means of a stem 77ª, such that swinging of the pointer is accompanied by a movement of the vane in the air gap 81 between the pole members 78 and 79. The vane 77 is made of a non-magnetic metal such as aluminum and during its movement in the air gap 81, it cuts the flux lines, and the eddy currents generated in the vane produce a retarding or dampening action on the vane, and hence, a retarding effect on the movement of the pointer 19.

The permanent magnet 80 can be of any suitable size and strength, but should be a magnet of high permanence characteristic, such that the effect of the dampening means will remain substantially constant during several years of service for the measuring instrument and such that the dampening means can be of a small size requiring very little space in the case 12. A permanent magnet which has been found to be suitable for the magnet 80 is a magnet known commercially as Alnico III and which comprises substantially the following composition: 12% aluminum; 25% nickel; and the balance, iron. Although the dampening means is desirable in the instrument 10, it can be omitted therefrom.

When the instrument 10 is being used as a voltmeter as shown in Fig. 6, the movable yoke arm 14ᵇ is maintained in a substantially exact open position at a predetermined spacing from the fixed arm 14ª, by the engagement of the lever member 45 with the spring clip 46. This spring clip is mounted on the side wall 32 of the case 12 and is of any suitable shape which will enable it to cooperate with the lever member in releasably holding the yoke arm 14ᵇ in its predetermined open position. In connection with the holding means for the yoke arm 14ᵇ, it should be explained that whenever this yoke arm is in its open position some of the flux being supplied to the frame 13 by the permanent magnet 74 leaks across the air space 82 and unless the amount of this leakage is held to a substantially constant value for all voltage measurements, the voltage readings will be inaccurate. By the accurate positioning of the yoke arm 14ᵇ, this flux leakage is kept substantially constant and error in the voltage readings is thus avoided.

Although the miniature battery 55, the push-button switch 56 and the selector switch 58 are shown diagrammatically in Figs. 3 and 6, it will be understood, of course, that these components of the energizing circuit for the movable coil 49 are actually located in the chamber 34 of the case 12. The actuating member 75 of the push-button switch 56 projects through the side wall 32 of the housing member 20, as shown in Fig. 1, at a point where it will be conveniently accessible to the operator's thumb or finger while the measuring instrument is being held in the palm of his hand.

In accordance with another feature of this invention, the housing member 20 is constructed so as to have a substantially flat bottom surface 83 and the frame structure 13 is located in the case 12 so that the projecting yoke portion 14 will be located above and be spaced a substantial distance from the plane of this bottom surface. When the yoke portion 14 is in this spaced relation above the bottom surface 83, the measuring instrument 10 can be placed on a vehicle fender, or on any other metallic part of the vehicle as a support, without having the magnet material of the vehicle in too close proximity to the yoke portion 14 and which might otherwise produce an undesired magnetic variation in the reading being obtained from the instrument while it is resting upon such a metallic portion of the vehicle.

From the accompanying drawings and the foregoing detailed description, it will now be readily understood that this invention provides a novel construction for an electrical measuring instrument and particularly for a volt-ammeter of the clamp-on type.

Although the novel measuring instrument has been illustrated and described herein to a somewhat detailed extent, it will be understood, of course, that the invention is not to be regarded as being limited correspondingly in scope, but includes all changes and modifications coming within the terms of the claims hereof.

Having thus described our invention, we claim:

1. In a direct-current electrical measuring instrument, means defining a magnetic circuit and comprising a frame structure of magnetic material having spaced pole portions and an openable yoke portion adapted to embrace a current-carrying conductor, a coil movable in the space between said pole portions, indicating means including a movable pointer connected with said coil to be actuated thereby, a battery having a substantially constant terminal potential and a milliampere current output rating, circuit means connecting said coil with said battery, and a permanent magnet of a high permanence characteristic and a low flux permeability contained in said magnetic circuit and having substantially fixed engagement with said pole portions and extending across said space, said magnet being a bar magnet of relatively small cross-sectional area, the indicating movement of said coil being responsive to the resultant effect of the fluxes produced by said permanent magnet and by the currents of said conductor and coil.

2. An electrical measuring instrument as defined in claim 1 in which the permanence characteristic of said permanent magnet is at least as high as that of Alnico V.

3. In a manually portable electrical measuring instrument, a housing, means defining a magnet circuit and comprising a frame structure of magnetic material having spaced pole portions located in said housing and an openable yoke portion projecting from said housing adapted to embrace a current-carrying conductor, a coil movable in the space between said pole portions, indicating means including an ampere scale having an electrical zero point and a pointer movable along said scale and connected with said coil to be actuated thereby, a battery located in said housing and having a substantially constant terminal potential and a milliampere current output rating, circuit means connecting said coil with said battery for direct application of substantially the full terminal potential of said battery of said coil, and a permanent magnet of a high permanence characteristic and a low flux permeability contained in said magnetic circuit and comprising a bar magnet having a direct and substantially fixed connection with said pole portions and extending across said space, said pointer being movable to said zero point by the resultant effect on said coil of the leakage fluxes produced by the coil current and said permanent magnet and said pointer being further movable beyond said zero point and along said scale by the effect on said coil of the flux produced by the current of the yoke-embracing conductor.

4. In a clamp-on electrical measuring instrument, a housing, means defining a magnetic circuit and comprising a frame structure having spaced pole portions disposed in said housing and a projecting yoke portion including an arm which is movable for opening and closing said yoke portion, indicating means including a coil movable in the space between said pole portions, circuit means connected with said coil, a battery in said circuit means for supplying energizing current to said coil, a permanent magnet comprising a bar magnet having relatively fixed engagement with said pole portions in spanning relation thereto and defining with the latter a magnetic circuit extending across said space, and holding means effective on said arm for releasably holding the same in an open position of a predetermined air gap width, said holding means comprising a movable latch member on said housing and a latch finger carried by said arm and engageable with said lach member.

5. In a manually-portable clamp-on electrical measuring instrument, a non-magnetic housing of a rounded generally quadrangular plan shape and of a size to be conveniently received and grasped in the palm of the human hand, means defining a magnetic circuit and comprising a frame structure of magnetic material having spaced pole portions located in said housing and arms projecting from said housing and defining a yoke portion, indicating means including a coil movable in the space between said pole portions, circuit means connected with said coil, a battery located in said housing and connected in said circuit means for supplying energizing circuit to said coil, a permanent magnet comprising a bar magnet contained in said magnetic circuit and having relatively fixed engagement with said pole portions in spanning relation to said space, one of said arms being movable relative to the other for opening and closing said yoke, a lever member connected with the movable arm, and latch means on said housing adapted for releasable holding engagement with said lever member and effective on the latter as a stop and locking means for limiting the opening movement of said movable arm and for locking said movable arm in an open position in predetermined spaced relation to said other arm.

6. In an electrical measuring instrument, a non-magnetic housing, means defining a magnetic circuit and comprising a frame structure of magnetic material having spaced pole portions located in said housing and arms projecting from said housing and defining a yoke portion, one of said arms being movable relative to the other for opening and closing said yoke portion, a coil movable in the space between said pole portions, indicating means including a movable pointer connected with said coil to be actuated thereby, circuit means connected with said coil, a battery located in said housing and connected in said circuit means for supplying energizing current to said coil, and a permanent magnet in said housing comprising a bar magnet contained in said magnetic circuit and having relatively fixed engagement with said pole portions in spanning relation to said space, said housing having a substantially flat bottom surface which is substantially devoid of projections and adapted for use as a support surface for parking the instrument in a relatively level and substantially stable relation and said arms being disposed in a plane which is offset a substantial distance above said bottom surface.

7. An electrical measuring instrument as defined in claim 6 in which the housing is of a size and shape to be conveniently received and grasped in the palm of the human hand.

8. In a volt-ammeter, a housing, means defining a magnetic circuit and comprising a frame structure of magnetic material having spaced pole portions in said housing and an openable yoke portion projecting from said housing and adapted to embrace a current-carrying conductor, said yoke portion being openable to a predetermined air gap width, a coil movable in the space between said pole portions, indicating means including a movable pointer connected with said coil to be actuated thereby, a miniature battery in said housing having a substantially constant terminal potential and a milliampere current output rating, a permanent magnet of a high permanence characteristic and a low flux permeability located in said housing and contained in said magnetic circuit, said permanent magnet having a direct and relatively fixed connection with said pole portions and extending across said space, a pair of terminal members on said housing and accessible from the exterior thereof, a switch in said housing comprising stationary contacts connected respectively with one of said terminal members and with one of the terminals of said battery and a movable switch member cooperating with said contacts, a coil circuit conductor connecting one end of said coil with said movable switch member, a second coil circuit conductor connecting the other end of said coil with the other of said terminal members and with the other terminal of said battery, and an actuating member projecting from said housing and connected with said movable switch members for manual shifting of the latter between said stationary contacts.

9. A volt-ammeter as defined in claim 8 in which the second coil circuit conductor is connected with said other terminal of the battery through a normally open manually operable switch.

10. A volt-ammeter as defined in claim 8 in which the permanent magnet is a bar magnet of a relatively small cross-sectional area and whose permanence characteristic is at least as high as that of Alnico V.

11. A volt-ammeter as defined in claim 8 which includes in combination a dampening means in said housing and effective on the movements of said pointer comprising a pair of cooperating fixed and movable dampening elements connected respectively with said frame structure and said pointer, and in which said housing is of a generally quadrangular plan shape having said yoke portions projecting from one end thereof and is of a size to be readily grasped and held in the human hand for manipulating the instrument.

12. In an electrical measuring instrument, means defining a magnetic circuit and comprising a frame structure having spaced pole portions and an openable yoke portion adapted to embrace a current carrying conductor, a scale, a coil movable in the space between said pole portions, a movable indicating member adjacent said scale and connected with said coil to be actuated thereby relative to said scale, circuit leads connected with said coil for use in supplying energizing current thereto, a permanent magnet comprising a bar magnet contained in said magnetic circuit and having a substantially fixed engagement with said pole portions and disposed in spanning relation to said space, said magnet having a high permanence characteristic and being effective to supply to said magnetic circuit a total number of lines of force sufficient to cause a substantial movement of said indicating member along said scale in response to energization of said coil, and dampening means effective on the movements of said indicating member comprising cooperating relatively movable dampening vane and dampening magnet elements connected respectively with said indicating member and frame structure.

13. In an electrical measuring instrument, means defining a magnetic circuit and comprising a frame structure having spaced pole portions and an openable yoke portion adapted to embrace a current carrying conductor, a housing connected with said frame structure and having said pole portions disposed therein, a scale, a coil movable in the space between said pole portions, a movable indicating member adjacent said scale and connected with said coil to be actuated thereby relative to said scale, a circuit connected with said coil, a battery located in said housing and connected in said circuit for supplying energizing current to said coil, a permanent magnet comprising a bar magnet contained in said magnetic circuit and having a substantially fixed engagement with said pole portions and disposed in spanning relation to said space, said magnet being a relatively long slender magnet having a high permanence characteristic and being effective to supply to said magnetic circuit a total number of lines of force sufficient to cause a substantial movement of said indicating member along said scale in response to energization of said coil, and dampening means effective on the movements of said indicating member comprising cooperating relatively movable dampening vane and dampening magnet elements connected respectively with said indicating member and frame structure.

References Cited in the file of this patent

UNITED STATES PATENTS

| | | |
|---|---|---|
| 1,105,481 | Brown | July 28, 1914 |
| 1,924,039 | Hockley | Aug. 22, 1933 |
| 2,002,680 | Scott | May 28, 1935 |
| 2,266,624 | Hall | Dec. 16, 1941 |
| 2,353,617 | Lamb | July 11, 1944 |
| 2,356,608 | O'Bryan | Aug. 22, 1944 |
| 2,440,244 | Brown | Apr. 27, 1948 |
| 2,663,845 | Koch | Dec. 22, 1953 |
| 2,697,204 | Otzmann | Dec. 14, 1954 |